Jan. 4, 1944.  J. A. GUYER  2,338,581
CATALYTIC PROCESS
Filed Jan. 5, 1942
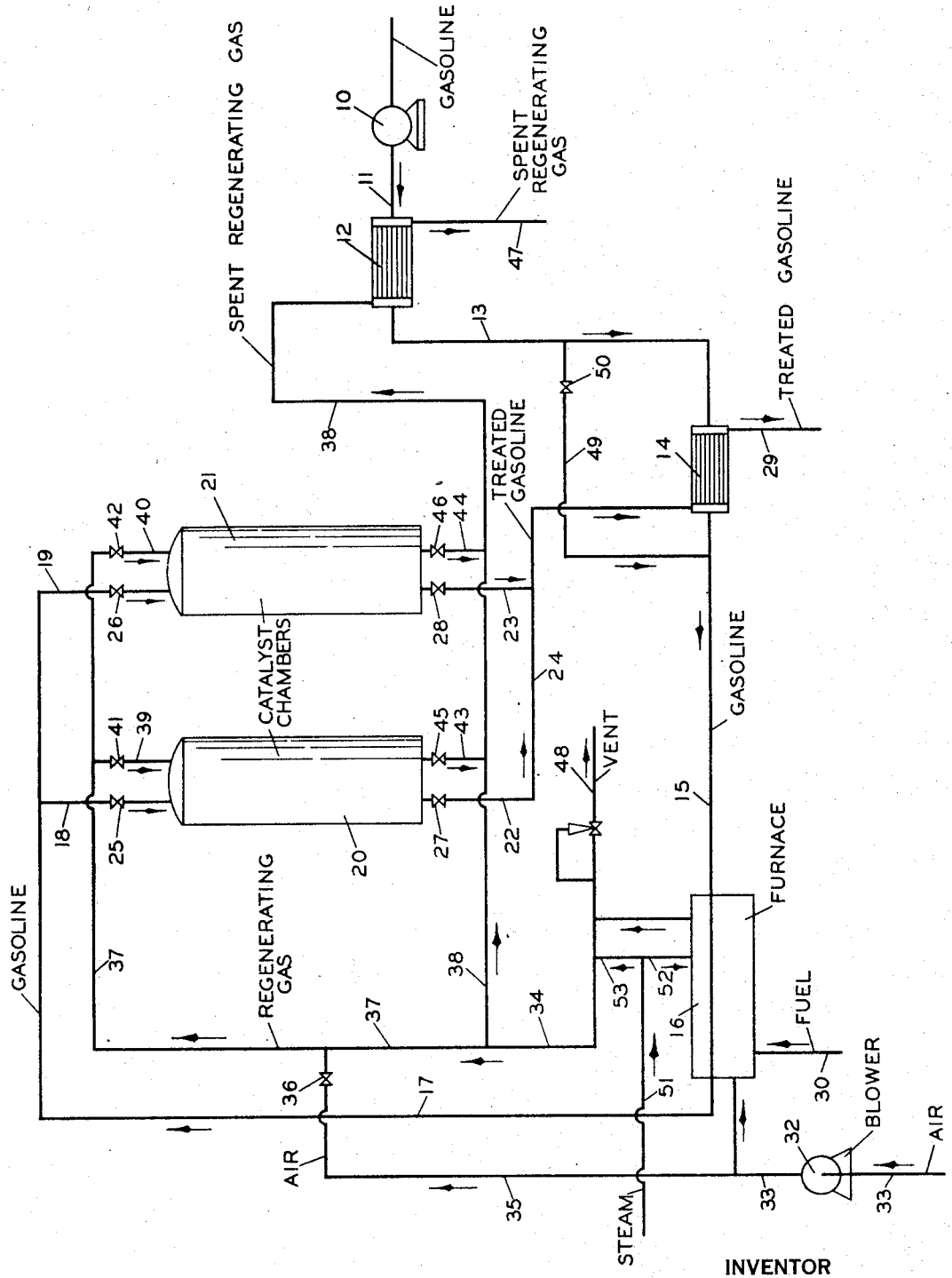
INVENTOR
JESSE A. GUYER
BY Hudson, Young & Yinger
ATTORNEY Patented Jan. 4, 1944

2,338,581

UNITED STATES PATENT OFFICE 2,338,581

CATALYTIC PROCESS

Jesse A. Guyer, Bartlesville, Okla., assignor to Phillips Petroleum Company, a corporation of Delaware Application January 5, 1942, Serial No. 425,685

2 Claims. (Cl. 196—28)

This invention relates to an improved process for conducting catalytic reactions and in particular to catalytic processes in which the catalyst is periodically regenerated by the use of oxygen-containing gases.

The features of the invention are applicable to any catalytic reaction in which a stream or streams or reactants to be catalytically treated or converted are heated and in which the catalytic treatment or conversion of the reactants is accomplished in one reaction vessel while simultaneously in another reaction vessel a deactivated catalyst is subjected to a burning-off process which removes carbonaceous material from the catalyst surface by the action of a hot gas containing a controlled amount of oxygen. Numerous examples of such processes are found in the petroleum industry, for instance, cracking, reforming, desulfurization, isomerization, dehydrogenation, hydrogenation, polymerization, etc.

In catalytic conversion processes wherein reactivation of the catalyst at relatively frequent intervals is necessary, it is common practice to incorporate into the plant design and equipment a sufficient number of catalyst-containing chambers, usually three or more, so that a regular cycle of converting and reactivating operations is possible. Such a cycle ordinarily includes a treating period during which a unit volume of the catalyst is employed in the conversion and a reactivating period during which the said unit volume of catalyst is subjected in situ to controlled combustion conditions by the passage of an oxygen-containing gas at or above the ignition temperature of the carbonaceous deposits.

Reactivation of solid granular catalyst masses by combustion requires careful control of the rate of burning to prevent deterioration of the physical and catalytic properties thereof, and to prevent damage to equipment, by excessive temperatures. Heat transfer within the catalyst mass is poor due to the non-conducting nature of the particles, and temperature control during combustion is usually attempted by the regulation of the oxygen content of the combustion atmosphere passed through the catalyst mass to thereby limit the exothermic heat generated per volume of gas. In this manner the combustion atmosphere may serve as both the temperature control mechanism and the principal heat transfer medium. During the period of reactivation it is often desirable to increase the oxygen concentration of the combustion atmosphere as the carbon content of the catalyst decreases, to maintain a reasonably constant temperature and to speed the reactivation operation.

However, the operating difficulties in such a procedure are centered in the regulation of the oxygen content of the combustion atmosphere. No ordinarily available gases have an oxygen content in the range required during the initial stages of reactivation which should be in the range of say 0.5 to 3 volume per cent.

Various methods have been proposed for producing and maintaining large volumes of gases of very greatly reduced oxygen content. It has been proposed, for example, to recycle the combustion atmosphere subsequent to passage through the catalyst undergoing reactivation as a source of substantially oxygen-free gas. Such recycle gas may then be blended with oxygen-containing gas in producing a combustion atmosphere of controlled oxygen content. This procedure is complicated by the fact that this recycle gas may have a substantial and fluctuating oxygen content at various intervals throughout the combustion period. This may be due to the fact that in the reactivation of catalysts disposed in multiple-tube reactors, the combustion may proceed unevenly due to unequal pressure drops in the various tubes. Similarly, in catalyst vessels of relatively large cross-sectional area uneven combustion may result from uneven carbon deposition. The necessary continual re-proportioning of the gas streams being mixed introduces expensive and troublesome operating control. Further, prior to recycling, the effluent combustion gas from the catalyst being reactivated is ordinarily chemically treated and/or scrubbed, dried, re-heated and the like to remove components deleterious to the catalyst or to the reactivating equipment, which involves additional complication and expense.

It has also been proposed to supply the required substantially oxygen-free gas in the form of steam. Such proposals are not feasible in many cases due to the high cost of providing the large amounts of steam required as well as to the frequent deleterious effects of high concentrations of steam on the catalyst. In the latter instance, control of the steam content as well as of the oxygen content of the combustion atmosphere may lead to the multiplication of control problems and to the use of expensive cooling and re-heating procedures to remove excess steam by condensation and to re-heat the combustion atmosphere to ignition temperatures.

It is an object of this invention to provide an improved process for carrying out catalytic reactions.

Another object of this invention is to provide a more economical process for carrying out catalytic reactions and for regenerating catalysts.

A further object is to combine the heating of reactants with the production of reactivating gas containing a controlled amount of oxygen in such a manner as to give a very efficient operation of both steps in a continuous catalytic process.

Other objects of the invention will be apparent from the following detailed description and accompanying drawing which is a flow sheet showing schematically one arrangement of equipment for carrying out a specific embodiment of the invention.

In general, my invention contemplates (1) heating a furnace by combustion of a fuel in such a manner as to use up substantially all the oxygen of the air introduced into the combustion zone, thus producing a hot flue-gas which is substantially oxygen-free or which contains less oxygen than is required for catalyst regeneration, (2) mixing with the hot flue-gas sufficient air or other oxygen-containing gas to give a gas of the desired low oxygen content, (3) passing the low-oxygen-content flue-gas over a deactivated catalyst for regenerating the catalyst, (4) heating a stream of reactants in said furnace by indirect heat exchange therein, and (5) passing said reactants over a catalyst for accomplishing any desired conversion. Various heat transfer arrangements are included to give a completely integrated catalytic process.

In order to point out the various features of this invention, a gasoline desulfurization and/or reforming process which includes regeneration of the catalyst will be described. However, the invention is not limited to this specific example, nor even to the processing of hydrocarbons, but may be applied to any catalytic process having heating and regenerating steps similar to those of the example, as will be understood by those skilled in the art.

Gasoline to be processed is forced by pump 10 through pipe 11 and is heated by passage through heat exchanger 12 through which flows hot spent regenerating gas. From there the gasoline is passed through pipe 13 to heat exchanger 14 for further heating by indirect exchange with hot treated gasoline, and then through pipe 15 to furnace 16 where it is heated to reaction temperature. From furnace 16, the reactants pass by means of pipe 17 either into pipe 18 and thence to catalyst chamber 20 or into pipe 19 and thence to catalyst chamber 2, wherein the desired conversion takes place. One of the most widely used catalysts for this process is bauxite, but other suitable catalysts are well known in the art, and need not be listed in detail. From catalyst chamber 20 or 21 the treated gasoline flows through pipe 22 or pipe 23, respectively, into pipe 24. The flow of gasoline through catalyst chambers 20 and 21 is controlled by valves 25 and 27 in pipes 18 and 22 respectively, and by valves 26 and 28 in pipes 19 and 23, respectively. Finally, the hot treated gasoline is passed from pipe 24 through heat exchanger 14 where it is cooled by the incoming gasoline, and then flows by means of pipe 29 to conventional purification steps such as hydrogen sulfide removal, fractionation, etc. for the production of a blending stock or finished motor fuel.

Simultaneously with the desulfurization and/or reforming of the gasoline in one of the two catalyst chambers, an oxygen-containing gas is passed through the other chamber, which contains deactivated catalyst, to burn off heavy carbonaceous material which has been deposited on the catalyst surface during a preceding conversion cycle. The manner of producing the regenerating gas will now be described.

The furnace 16 is heated by the burning of any kind of fuel. In order to simplify the explanation of the invention, the operation of the furnace will be described referring to a high methane content gas which is available in large quantities at refineries, and which is a preferred fuel. However, free-hydrogen-containing gases, fuel oil, coke, etc., could be used if desired by means of obvious modifications. The fuel, in this case gaseous, is fed through pipe 30 into furnace 16. Air impelled by blower 32, or any suitable equivalent thereof, flows through pipe 33 and is fed into furnace 16 through or adjacent to pipe 30 to supply the oxygen necessary for supporting combustion of the fuel. The furnace 16 ordinarily is operated under a pressure of about 5 to 15 pounds per square inch gauge, and the relative volumes of fuel and air are regulated so as to use up almost all of the oxygen. Thus the oxygen content of the combustion gases leaving furnace 16 may generally be from zero to about one per cent. Conditions are maintained so that said oxygen content is always lower than that desired in the regeneration gases. The products of combustion leave furnace 16 through pipe 34, and may then pass either to pipe 37, or to pipe 38, or to both, and a portion may be vented through pipe 48. Excess combustion gas which is not required for regeneration, but which may be used to help heat incoming gasoline in heat exchanger 12, is by-passed around the catalyst chambers by means of pipe 38. A small stream of air from pipe 33 is by-passed around furnace 16 by means of pipe 35, and joins the products of combustion in pipe 37. The oxygen content of the gas in pipe 37 is controlled by valve 36, which allows the desired quantity of air to pass through so as to give a low percentage of oxygen, usually in the range of about 0.5 to 3.0 volume per cent during the initial portion of the burning-off period. This hot flue-gas in pipe 37 thus admixed with a small percentage of oxygen flows either through pipe 39 containing valve 41 into catalyst chamber 20, or through pipe 40 containing valve 42 into catalyst chamber 21. In the catalyst chamber, the carbon and heavy residue deposited on the catalyst during the previous gasoline processing cycle are burned off gradually and the catalyst is thus regenerated. The regenerating gas, now somewhat increased in temperature, passes into pipe 38 from catalyst chamber 20 or 21 through pipe 43 containing valve 45 or through pipe 44 containing valve 46, respectively. Thus, the stream of spent regenerating gas is mingled with the portion of the gaseous products of combustion which was by-passed around the catalyst chambers in pipe 38, and the hot gases then leave the system by way of vent 47, passing first through heat exchanger 12 to heat the gasoline which is just entering the system.

It will be understood, of course, that when catalyst chamber 20, for instance, is on stream for catalytic treatment of the gasoline, valves 25 and 27 are open, allowing heated gasoline to pass over the catalyst, while the valves 26 and 28 are closed. Meanwhile valves 41 and 45 are closed, and valves 42 and 46 may be open, thus allowing regenerating gases to pass through catalyst chamber 21. This continues until regeneration, and purging as described below, of the catalyst in chamber 21 is completed. Then valves 42 and 46 are closed, and all the products of combustion may be by-passed through pipe 38. Before and after the passage of oxygen-containing gas over the catalyst for burning off carbon, the valve 36 is closed and hot, substantially oxygen-free products of combustion are passed from pipe 37 through the catalyst chamber in order to purge it of, first, residual gasoline, and second, residual oxygen-containing regenerating gas. When the catalyst in chamber 20 becomes deactivated to such an extent that the reactions are slowed to an uneconomic rate, valves 26 and 28 are opened, and valves 25 and 27 are closed, thus causing the gasoline to pass over the regenerated catalyst in chamber 21. Purging and regeneration of the catalyst in chamber 20 is then started by opening valves 41 and 45. In this manner, the catalytic conversion is always being carried out in one chamber, while the catalyst in the other chamber is being purged, regenerated, or is standing by after regeneration. Of course, the purging and regeneration may be regulated so as to require the same length of time as the conversion cycle. For periods during which the system is being put on-stream, or during which one catalyst chamber is being used for gasoline processing while regeneration of the other has been completed, or at other times in which not all the products of combustion are needed for heating purposes in heat exchanger 12, the excess flue-gas may pass from the system through vent 48. Furthermore, vent 48 is used to vary the volume of gas passing to lines 37 and 38, especially when the oxygen content of the gas in line 37 is being increased or reduced by means of valve 36, as will be described later in more detail.

Occasionally, it may be found desirable, if the catalyst used will permit, to introduce water or steam from line 51 either directly into furnace 16 via line 52 or into the combustion products in line 34 via line 53. This steam may be utilized to assist in controlling the temperature of the combustion products and thus add to the flexibility of operation attainable by use of my invention.

Additional control of temperatures is accomplished by means of by-passes around the various heat exchangers, as illustrated by pipe 49 controlled by valve 50, which allows any desired amount of the gasoline stream to pass around heat exchanger 14. Of course, recycling a portion of the treated gasoline stream or fractions thereof, or light gases, and other variations of a catalytic process of this type may be resorted to. However, such modifications do not form a part of this invention, and are therefore not discussed in detail. Obviously, more than two catalyst chambers may be used in the process in accordance with well known principles of catalytic operations.

Combustion of fuel in furnace 16 is carried out at moderate super-atmospheric pressures of 5 to 15 pounds per square inch gauge, or sometimes up to 50 pounds per square inch gauge, which pressures are sufficient to give proper combustion, and to maintain flow of the combustion atmosphere on through the catalyst chambers and heat exchangers without further compression. This is very desirable, in that it eliminates the necessity for compression of hot gases. The system pressure from the fuel line 30 and the compressor or blower discharge line 33 to the final venting 47 and 48 may be regulated within the indicated pressure range by suitable back-pressure regulators not shown in the drawing.

The design of the furnace may be varied according to the volume of reactants to be heated, the temperatures required for reaction and reactivation, the volume of reactivating gas desired, the fuel used, the possible corrosive effects of reactants and fuel, etc. The gasoline flows through tubes in the furnace which are arranged so as to pick up radiant heat from the combustion. In this way, the gasoline may leave the furnace heated to the proper reaction temperature while the combustion gases are cooled by loss of heat to the incoming gasoline until their temperature is such that after admixture with the cold by-passed air, the low-oxygen content gas thus produced is at the proper temperature for carrying out regeneration. No separate cooling means is required in the regenerating gas line between the furnace and the catalyst chamber. If desired, some steam from line 51 may be used as an adjunct to effect final control of temperature.

Any fuel may be utilized in carrying out this invention; however, some discrimination in the choice of fuel may be necessary in certain cases. For instance, if a catalyst is used which cannot tolerate high concentrations of steam, a fuel which contains a high percentage of free or combined hydrogen would not be suitable, and a better choice would be coke or fuel oil.

The desired temperature of the reactivating gas will depend upon the catalyst and sometimes upon the stage of regeneration. That is, it may be desirable to increase the temperature somewhat during the latter portion of a reactivation cycle. This may be accomplished by increasing the oxygen content.

The basic control of the process is reduced to the proportioning of the volumes of the fuel and air which are mixed in the furnace, of combustion gases passed to the catalyst chamber, and of the air which is by-passed for controlling the oxygen content of the regenerating gas stream. In its simplest aspects, the control comprises regulation of the valves or flow controllers in the lines 30, 33, 37, and 35 to produce a gas mixture of any desired oxygen concentration up to a fairly large proportion of air. This covers all ordinary reactivation steps, and indicates the flexibility and simplicity of operation of my process. Operating controls such as proportioning flow controllers actuated by the temperature of the effluent gas from the catalyst bed may be employed if desired. The preferred method of operating comprises passing a constant volume of regenerating gas over the catalyst and varying the oxygen content by increasing or decreasing the flow through lines 35 and 48, to give a greater or smaller percentage of oxygen while maintaining constant volume. Thus, toward the end of a reactivation period, the volume of gas vented through line 48 may be increased, while valve 36 is opened a little more to supply a greater volume of air. When valve 36 is closed to permit purging, the vent valves may also be closed sufficiently to prevent a change in the volume of purge gas.

When conversion in a catalyst chamber has fallen to an undesirably slow rate or when too much side reaction is occurring, or in other words when for any reason it is desired to initiate regeneration of a catalyst mass, the flow of reactants over the particular volume of catalyst is stopped and hot regenerating gases are caused to pass through the chamber. Initially, the reactants must be purged from the reaction vessel and, in the case of hydrocarbons it is necessary to do this with an oxygen-free gas. In my process, this oxygen-free gas may come from furnace 16 through lines 34 and 37, valve 36 being closed as described above. A quantity of steam from line 51 may sometimes advantageously be admixed with this gas to lower any residual oxygen content and to aid in the purging of hydrocarbons. Or steam alone or any other suitable inert gas or mixture of inert gases may be utilized if the type of catalyst will permit.

After the catalyst bed is purged substantially free of volatile hydrocarbons, combustion is initiated by the introduction of gas containing low percentages of oxygen. The temperature of the catalyst may be raised or lowered by the purging operation, and the temperature of the oxygen-containing combustion atmosphere initially admitted is ordinarily regulated to minimum ignition temperatures in the range of 500 to 1000° F., depending on the type of catalyst, the nature of the catalytic conversion it has promoted and the maximum temperatures desired in reactivation, as is well known to those skilled in the art.

Pressures in my reactivation are moderate super-atmospheric pressures which may range from values at the blower discharge just sufficient to overcome the total pressure drop in the system to higher values of 50 pounds gauge or more maintained by pressure regulators on the effluent gas lines. In some cases, higher pressures are beneficial in shortening the final stages of reactivation. However, the preferred pressure range for most processes is from about 5 to about 15 pounds per square inch gauge.

According to present knowledge the reactivating combustion may be divided into two phases according to the potential rate of combustion. The first or rapid phase includes the period required for removal of the surface coating of carbonaceous material from the catalyst granules. In this period the oxygen content of the combustion must be very low, generally of the order of from less than 1 to about 3 volume per cent to prevent excessive temperatures at the combustion front or zone of intense oxidation.

The combustion front proceeds uniformly in the direction of reactivating gas flow and eventually reaches the end of the catalyst bed. This terminates the first phase of reactivation. The second phase includes the combustion of carbonaceous material mostly beneath the surface of the catalyst granules, and higher oxygen concentrations in the combustion atmosphere are frequently permissible and necessary to rapidly complete the reactivation. In this phase the weight of carbonaceous material removed is relatively small compared to the total weight originally present, and the rate of combustion is much slower. Oxygen concentration of the order of 2 to 10 per cent or more may be employed without producing excessive temperatures.

At the completion of the reactivating combustion, the flow of oxygen-containing gas is discontinued, and the catalyst is again purged with substantially oxygen-free gas to prepare said catalyst for further conversion service.

As heretofore pointed out, the adjustment of my process to any existing or desired set of conditions involves only proper control of the volume and temperature of the indicated gas streams being mixed at a single point in the system.

The following example will serve to illustrate the specific operating details of a gasoline desulfurization process, and is described with reference to the drawing.

*Example*

Sulfur-bearing gasoline in a quantity of 1,500 barrels per day (16,160 pounds per hour) and at normal atmospheric temperatures is forced by pump 10 through heat exchanger 12, which gives up 1,134,000 B. t. u. per hour to the gasoline. Passage of the thus-warmed gasoline through heat exchanger 14 increases its heat content by 4,300,000 B. t. u. per hour. Then 3,500,000 B. t. u. per hour is added to the gasoline in furnace 16 to increase its temperature to 765° F.

The heated gasoline then passes through one of the catalyst chambers containing bauxite, wherein a high percentage of the sulfur compounds present in the gasoline is converted to hydrogen sulfide. On the average, 32.4 pounds of carbon per hour is deposited on the catalyst. The effluent gasoline is at a temperature of 750° F., and after passing through heat exchanger 14, leaves the system at a temperature in the neighborhood of 325° F. Further treatment is required for hydrogen sulfide removal and stabilization of the desulfurized gasoline.

The heat in furnace 16 comes from the combustion of 76 cubic feet per minute (measured at normal temperature and pressure) of dry natural gas with 760 cubic feet per minute of air. This quantity of air is sufficient for the complete combustion of the fuel, and a substantially oxygen-free flue-gas is thus produced. Air by-passed through pipe 35 and valve 36 is introduced to give a controlled low oxygen content gas in line 37. During most of the regeneration, the oxygen content is held to below 3 per cent. For the sake of simplicity, the conditions at one stage of the process will be described, namely, when the regenerating gas contains 1.9 per cent oxygen, due to the addition of 84 cubic feet per minute of cold by-passed air. The volume of regenerating gas is 920 cubic feet per minute and it is passed at an initial temperature of 700° F. through a chamber which contains deactivated catalyst. Combustion of carbonaceous material occurring in the chamber causes the temperature of the regenerating gas to increase to 1075° F. This hot, spent regenerating gas passes through heat exchanger 12 for heating the incoming gasoline and then leaves the system. Each catalyst chamber is utilized in the cycles of desulfurization, purging, regeneration, and purging as heretofore fully explained.

The advantages of my invention are many. Most important are the economies of equipment and operating costs which are made possible. For instance, in a process such as that described in detail above, initial investment costs for apparatus for heating reactants and for producing and handling regeneration gas are lower by 15 to 30 per cent than those for a conventional plant. Great savings in operating costs are obtained through the use of only one portion of fuel both to heat the reactants and to form a regenerating gas. By this means, a reduction of at least 50 per cent in the quantity of fuel required for operation is realized. The heat exchange arrangements insure that only a minimum quantity of heat is lost from the system. Also, power costs for blowing air, etc., are lowered, and the regenerating gas is furnished at a satisfactory pressure without the necessity of compressing a hot gas. By utilizing my invention, a very desirable flexibility of operation is attainable, whereby the oxygen content and temperature of the regenerating gas are easily controlled to give proper regeneration conditions at all times.

As heretofore pointed out, this invention is in no way limited to the specific example described, but may be used with advantage in a great number of catalytic processes. Thus, my invention is not limited to the reactivation of any particular type of catalyst nor to any specific conversion in which catalysts are deactivated by the deposition of carbonaceous deposits. In general, the catalysts to be reactivated according to the terms of the foregoing disclosure are those which are restored to a suitable activity under the specified controlled conditions but which are susceptible to deterioration if the said specified conditions are exceeded during reactivation treatment. Examples of such materials are the various contact catalysts classified as clay-type and mineral ore materials and natural or synthetic metal oxides including the difficultly reducible oxides alone or in mixtures with each other and/or promoted with other metals or metal salts. Specific examples are bauxite and bauxite impregnated with chromium, zirconium, and other oxides used in cracking, dehydrogenation, aromatization and desulfurization conversions and composite catalysts prepared from silicon and aluminum oxides and activated silicates.

The terms reactivation and regeneration are used herein as synonyms.

I claim:

1. A process for the catalytic desulphurization of hydrocarbons wherein the catalyst becomes deactivated by the deposition of carbonaceous materials thereon which comprises passing sulphur-bearing hydrocarbons in indirect heat exchange with hot spent regeneration gases, passing the so-heated hydrocarbons in indirect heat exchange with hot desulphurized hydrocarbons, bringing the total reactant stream of said sulphur-bearing hydrocarbons up to reaction temperature in a heating means, burning fuel in said heating means in the presence of an amount of air such that a flue gas containing less than about one per cent of oxygen is formed by combustion, purging residual reactants from a deactivated catalyst by means of said gas, thus heating the sulphur-bearing hydrocarbons while producing a hot substantially oxygen-free flue gas, contacting the heated hydrocarbons with an active desulphurization catalyst for reducing the sulphur content of said hydrocarbons, whereby carbonaceous matter is gradually deposited on said catalyst lowering the activity thereof, admixing air with the hot, substantially oxygen-free flue-gas in controlled amounts to give a regenerating gas of low oxygen content, contacting said low-oxygen-content gas with the desulphurization catalyst of lowered activity for the regeneration of said catalyst, and periodically alternating the flow of sulphur-bearing hydrocarbons and regenerating gas over each separate catalyst mass so as to maintain the activity of the catalyst.

2. A process for the catalytic desulphurization of hydrocarbons wherein the catalyst becomes deactivated by the deposition of carbonaceous materials thereon which comprises passing sulphur-bearing hydrocarbons in indirect heat exchange with hot spent regeneration gases, passing the so-heated hydrocarbons in indirect heat exchange with hot desulphurized hydrocarbons, bringing the total reactant stream of said sulphur-bearing hydrocarbons up to reaction temperature in a heating means, burning fuel in said heating means in the presence of an amount of air such that a flue gas containing less than about one per cent of oxygen is formed by combustion, purging residual reactants from a deactivated catalyst by means of said gas, thus heating the sulphur-bearing hydrocarbons while producing a hot substantially oxygen-free flue-gas, contacting the heated hydrocarbons with an active desulphurization catalyst for reducing the sulphur content of said hydrocarbons, whereby carbonaceous matter is gradually deposited on said catalyst lowering the activity thereof, admixing air with the hot substantially oxygen-free flue-gas in controlled amounts to give an initial temperature of approximately 700° F. and a final temperature of approximately 1075° F. in the deactivated catalyst bed, contacting said low-oxygen-content gas with the desulphurization catalyst of lowered activity for the regeneration of said catalyst, and periodically alternating the flow of sulphur-bearing hydrocarbons and regenerating gas over each separate catalyst mass so as to maintain the activity of the catalyst.

JESSE A. GUYER.